United States Patent

[11] 3,629,629

| | | |
|---|---|---|
| [72] | Inventors | Wolfgang Liebe;<br>Maria Susanne Wendt, both of Berlin, Germany |
| [21] | Appl. No. | 80,328 |
| [22] | Filed | Oct. 13, 1970 |
| [45] | Patented | Dec. 21, 1971 |
| [73] | Assignee | Siemens Aktiengesellschaft<br>Berlin, Germany |
| [32] | Priority | Oct. 17, 1969 |
| [33] | | Germany |
| [31] | | P 19 53 110.3 |

[54] ELECTRICAL MACHINE HAVING SALIENT ROTOR POLES
13 Claims, 5 Drawing Figs.
[52] U.S. Cl. .................................................. 310/59, 310/61, 310/269
[51] Int. Cl. .................................................. H02k 9/02
[50] Field of Search............................................ 310/60, 61, 65, 60 A, 269, 218, 59

[56] References Cited
UNITED STATES PATENTS
2,271,981  2/1942  Kent.............................. 310/60 A X Primary Examiner—D. X. Sliney
Attorneys—Curt M. Avery, Arthur E. Wilfond, Herbert L. Lerner and Daniel J. Tick ABSTRACT: An electrical machine has a salient pole rotor with respective pole windings and a stack of rotor laminations disposed radially with respect to the rotor. The machine is coolable by air passing parallel to the rotor axis through interpolar gaps defined by mutually adjacent rotor poles and continuing radially over the stator laminations. The improvement provides for a plurality of deflectors for partially blocking the respective interpolar gaps at the inlet side thereof. Each of the deflectors lies in a radial plane substantially perpendicular to the rotor axis and extends across the interpolar gap defined by a pair of next-adjacent rotor poles so as to lie against the respective pole windings corresponding to the latter; these deflectors block at least the respective radially inner portions of the openings.

Inventor:

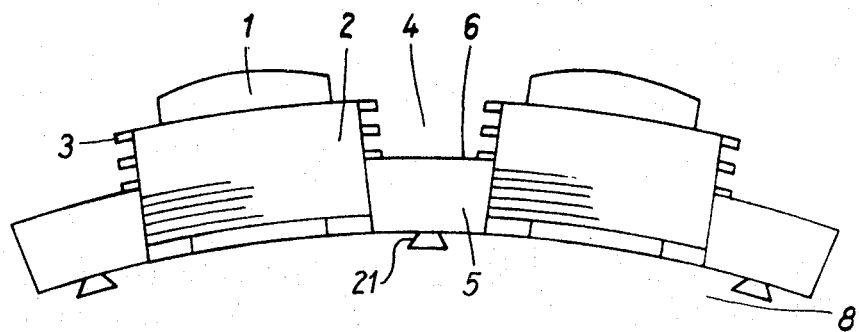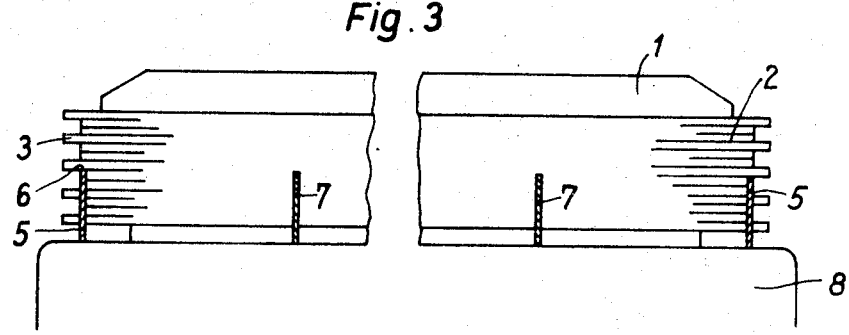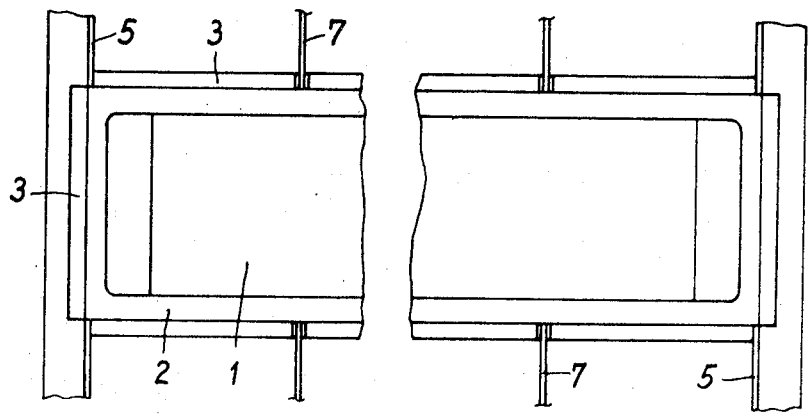

ELECTRICAL MACHINE HAVING SALIENT ROTOR POLES

Our invention relates to electrical machines having salient pole rotors equipped with deflectors positioned on the rotor for partially blocking the passage of cooling air, whereby the machine efficiency and ventilation is increased and ventilation losses are reduced.

More particularly, our invention relates to an electrical machine having a salient pole rotor that is cooled by air streaming through the interpolar gaps in axial direction and then flowing radially out over the stack of stator laminations. This cooling air streaming through the rotor is known to generate ventilation losses that play a decisive role with regard to power economy and can markedly reduce the efficiency of the machine, this being especially the case for machines having a relatively high rotation speed.

Increasing the efficiency of electrical machines of large capacity as well as those having a low capacity is of great importance. Accordingly, it is an object of our invention to reduce the ventilation losses occurring in electrical machines as a consequence of the salient poles of the machines.

Subsidiary to the foregoing object, it is an object of our invention to reduce the ventilation losses associated with the salient pole rotor of an electrical machine of conventional construction by approximately one-half.

From German Pat. No. 155,539 it is already known to reduce ventilation losses by retrofitting the rotor of an electrical machine having salient poles with intermediate members located on the surfaces of the interpolar gaps and on the front surfaces so as to approximate a smooth cylinder. The front end of the machine is thereby fully closed by the intermediate members lying in front of the pole windings, so that no amount of cooling air can enter the interpolar gaps, while the intermediate members at the surfaces of the interpolar gaps are provided with ventilation holes. The cooling of the rotor winding is greatly hindered by this well-known measure for reducing ventilation losses.

In order to improve the passage of cooling air while at the same time having only small ventilation losses, it is additionally known from the German Pat. No. 172,336 to cover the salient pole rotor of an electrical machine with a drum like structure, the latter surrounding the entire magnetic system. The drumlike structure is cylindrical and surrounds the entire magnetic system. In addition, the drumlike structure is penetrated by the pole shoes. The air entering the interpolar gaps from the front end is then indeed not affected, however, the air cannot be directed away radially through the stack of stator laminations. Also, only a small reduction of the ventilation losses is achieved by means of this very expensive covering of the rotor surface.

From U.S. Pat. No. 2,271,981 and French Pat. No. 679,487, it is known in electrical salient pole machines that to reduce the through flow losses of the cooling air in the axial interpolar gaps, guiding vanes can be arranged in the axial interpolar gaps at the inlet sides thereof. The guiding vanes are formed so as to be deflectorlike segments, and are precisely as high as the pole winding. The guiding vanes run diagonally in axial direction and provide a channel for the cooling air either at the edge of the pole winding or in the middle of the interpolar gap, the channel being restricted from the free radial edges of the pole winding and/or of the guiding vanes. In this way the through flow losses and the quantities of cooling air entering the interpolar gaps are influenced.

The present invention also relates to an arrangement wherein deflector segments are provided in the interpolar gaps. However, the construction of the deflectors of the instant invention distinguishes significantly from the known deflector segments. The deflectors of the instant invention do not serve as guiding vanes for the entrance of cooling air into the interpolar gaps, rather, they serve to substantially reduce ventilation losses without hindering the cooling of the rotor windings by the cooling air, the latter streaming axially through the interpolar gaps and continuing radially out over the stator laminations. According to a feature of the instant invention, we provide a plurality of deflectors for partially blocking the respective interpolar gaps at the air inlet side thereof. Each of the deflectors lies in a radial plane substantially perpendicular to the rotor axis and extends across the air inlet opening ends of the interpolar gap defined by a pair of next-adjacent rotor poles so as to lie against the respective pole windings corresponding to the latter. In this way these deflectors block at least the respective radially inner portions of the openings.

These deflectors which are secured to the rotor in a simple manner and which rotate together with the rotor afford a minimal expense. Since these deflectors do not block the entire interpolar gap and instead cover only a portion thereof, the conduction of cooling air is not significantly choked. The deflectors do not significantly hinder the cooling of the rotor and afford the unexpected result that the ventilation losses are greatly reduced, because they reduce the so-called zero losses, that is, they reduce that loss portion which remains by a complete choking of the cooling air. These zero losses are above all caused by secondary flow phenomena. With machines having salient poles on the rotor, there belongs in the first instance the edge phenomena produced or excited by the exposed corners of the pole windings. These phenomena are suppressed in large measure by the deflectors according to the invention which are provided in the interpolar gaps at the air inlet sides thereof.

It is especially efficacious if the upper edge of the deflector is made to be approximately half the height of the pole. This feature permits the ventilation losses of a salient pole rotor of conventional construction to be reduced to approximately one-half of the losses of the same machine not equipped with the deflectors. The inlet openings for the cooling air remain in this manner sufficiently large.

The ventilation losses are significantly reduced in this manner when in addition to the deflectors, partitions are provided and arranged transverse to the rotor axis, each of the partitions extending across the gap defined by a pair of next-adjacent rotor poles so as to lie against the respective pole windings corresponding to the latter. These partitions are positioned symmetrically with respect to the perpendicular center plane of the rotor and are arranged in the gaps so as to block the lower portion thereof. The deflectors with which these partitions cooperate are aligned with the pole fronts at the air inlet sides of the interpolar gaps and can be set back only slightly in the interpolar gap. These partitions or transverse walls have approximately the same height as the deflectors provided in accordance with the invention. The partitions divide the interpolar gaps so as to provide a convenient influence on the flow phenomena within the interpolar gap without deleteriously affecting the conduction of cooling air and the cooling action.

It is recommended that the deflectors and/or partitions be made of nonmagnetic material such as for example brass, synthetic material or nonmagnetic steel. Since the cooling relationships of an electric machine of large capacity are often first ascertainable at the installation site of the machine, it is also advantageous to construct the deflectors and/or partitions so as to be removably secured to the rotor and especially, to be adjustable in a direction parallel to the rotor axis. The deflectors and partitions can in this way later be adjusted with regard to their position and can be adapted for example to change to the operating conditions of the machine in order to obtain an optimal reduction of the ventilation losses.

The application of the invention is especially advantageous in electric machines having a large capacity wherein only the rotor is cooled by cooling air drawn by suction into the machine and streaming through the interpolar gaps and where in a direct liquid cooling or gas cooling is provided for the stator within the conductor or the stack of laminations.

The invention will now be described with reference to the drawings wherein:

FIG. 2 is a front view of a portion of the rotor of the machine illustrated in FIG. 1;

FIG. 3 is a longitudinal view, partially in section, taken at an interpolar gap of the rotor of the machine of FIG. 1;

FIG. 4 is a top view of a pole of the rotor of the machine in FIG. 1; and

Figure 1:
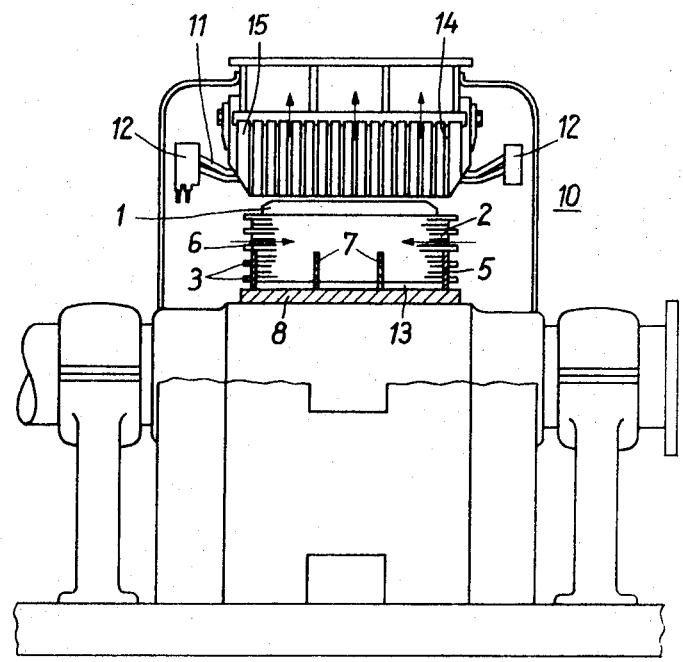
FIG. 1 is a schematic representation of an electrical machine provided with deflectors according to the invention.

In an electric machine 10 of large capacity, for example as in a water-powered generator, the stator winding 11 is direct liquid cooled. The incoming and outgoing of liquid coolant from collection conduits that are not illustrated and also the transfer of liquid coolant from one winding bar to the next is obtained with respective liquid chambers 12 arranged at the end of the bars of the stator winding 11.

The rotor 13 of the electric machine 10 has salient poles 1 that carry pole windings 2. The windings 2 comprise flat copper conductors of which several project outwardly as cooling fins 3.

The cooling of the rotor 13 of the electric machine 10 is achieved by cooling air that is directed to within the machine by a blower (not illustrated) separate from the machine. The cooling air enters the interpolar gap 4 at the air inlet openings thereof. The air passes axially through these gaps and then flows upwardly and out in a radial direction over the cooling channels 14 in the stack of stator laminations 15. According to a feature of the invention, the lower portion of the inlet openings of the interpolar gaps are blocked by respective deflectors lying in a radial plane substantially perpendicular to the rotor axis. The upper edge 6 of the deflectors 5 are at approximately half the pole height.

The deflectors 5 lie laterally on the polar windings 2 where, if necessary, the pole or cooling fins 3 can be milled off to accommodate the deflectors 5. When viewed in the direction of the rotor axis, deflectors 5 do not lie entirely aligned with the front face of the pole windings 2, instead, they are recessed into the interpolar gap by an amount equal to the width of the cooling fins 3. In this way, the cooling of the front faces of the pole windings 2 is not affected, and for the entrance of the cooling air into the interpolar gaps 4, a sufficiently large cross section is available, however, the height of the stationary, radial running edges of the pole windings 2 is reduced by the deflectors. In this way, the flow phenomena excited by these edges are reduced by a considerable amount so that the ventilation losses are reduced.

In addition, there are provided in the interpolar gaps 4 several partitions 7. These partitions extend transverse to the rotor axis and lie against the sides of the pole windings 2. Also, these partitions block the lower portion of the interpolar gap 4. The partitions 7 lie symmetrically with respect to the perpendicular center plane of the rotor and partition each polar gap 4 into small sections. The length of these sections is determined for an individual case, for example, so that the middle section is approximately twice the size of the side sections. The partitions 7 have approximately the same height as the respective deflectors 5. The partitions 7 function to influence the ventilating phenomena at the inner region of the interpolar gaps 4 and reduce, in addition to the deflectors 5, the ventilation losses still further.

Figure 5:
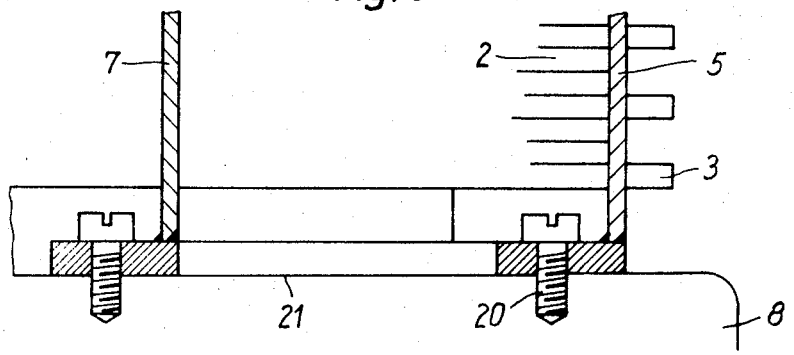
FIG. 5 illustrates schematically the means for securing the deflectors and partitions of the invention to the rotor.

The deflectors 5 and partitions 7 are removably secured to the rotor and revolve therewith. Deflectors 5 and partitions 7 are secured to the rotor by radially directed bolts 20 as shown in FIG. 5. The foot pieces of the deflectors and partitions are provided for example with a T head held in an axially running slot 21 (FIG. 2) in the rotor 8, so that the deflectors 5 and/or partitions 7 may be positioned with precision with respect to their axial position. With this arrangement, deflectors 5 and/or partitions 7 may at any time be adjusted as desired, simply by tightening the bolts 20 (FIG. 5).

While the invention has been described by means of a specific example and in specific embodiment, we do not wish to be limited thereto, for obvious modifications will occur to those skilled in the art without departing from the spirit and scope of the invention.

We claim:

1. In an electrical machine having salient-pole rotor with respective pole windings and a stack of stator laminations disposed radially with respect to said rotor, the machine being coolable by air passing parallel to the rotor axis through interpolar gaps defined by mutually adjacent rotor poles and continuing radially over the stator laminations, the improvement which comprises a plurality of deflectors for partially blocking the respective interpolar gaps at the air inlet side thereof, each of said deflectors lying in a radial plane substantially perpendicular to the rotor axis and extending across the interpolar gap defined by a pair of next-adjacent rotor poles so as to lie against the respective pole windings corresponding to the latter, said deflectors blocking at least the respective radially inner portions of said gaps.

2. In an electrical machine according to claim 1, each of said pole windings having laterally projecting cooling fins said deflectors being set back in axial direction against said pole windings by an amount corresponding to the width of said cooling fins.

3. In an electrical machine according to claim 1, each of said deflectors having an upper edge at an elevation corresponding to half of the height of said rotor poles.

4. In an electrical machine according to claim 1, said deflectors consisting of nonmagnetic material.

5. In an electrical machine according to claim 1, said improvement comprising holding means at the interface of said deflectors and said rotor for removably securing said deflectors to the latter.

6. In an electrical machine according to claim 5, said improvement comprising ancillary means engageable with said holding means for adjusting said deflectors in a direction parallel to said rotor axis.

7. In an electrical machine according to claim 6, said holding means being bolts engageable with said rotor in radial direction, and said ancillary means being slots in said rotor for holding said bolts.

8. In an electrical machine according to claim 1, at least two partitions disposed in each of said gaps for blocking the lower portion thereof, said partitions being transverse to the rotor axis and extending across said gap defined by said pair of next-adjacent rotor poles so as to lie against said respective pole windings corresponding to the latter, said partitions being positioned symmetrically with respect to the perpendicular center plane of the rotor.

9. In an electrical machine according to claim 8, said partitions having an elevation corresponding to the elevation of said deflectors.

10. In an electrical machine according to claim 8, said deflectors and said partitions being made of nonmagnetic material.

11. In an electrical machine according to claim 8, said improvement comprising holding means at the interfaces of said deflectors and said partitions with said rotor for removably securing said deflectors and said partitions to the latter.

12. In an electrical machine according to claim 11, said improvement comprising ancillary means engageable with said holding means for adjusting said deflectors and said partitions in a direction parallel to said rotor axis.

13. In an electrical machine according to claim 12, said holding means comprising bolts engageable with said rotor in radial direction, and said ancillary means being dovetail slots in said rotor.

* * * * *